United States Patent [19]

Fleming, Jr.

[11] Patent Number: 5,193,389
[45] Date of Patent: Mar. 16, 1993

[54] RECIPROCATING PISTON POSITIVE DISPLACEMENT FLOW METER

[76] Inventor: William T. Fleming, Jr., 139 Red Mill Rd., Glen Gardner, N.J. 08826

[21] Appl. No.: 707,096

[22] Filed: May 29, 1991

[51] Int. Cl.⁵ .............................................. G01F 3/14
[52] U.S. Cl. ........................................................ 73/239
[58] Field of Search ........................... 73/239, 249, 250

[56] References Cited

U.S. PATENT DOCUMENTS

| | | | |
|---|---|---|---|
| 1,974,202 | 9/1934 | Blum | 73/239 X |
| 2,014,664 | 9/1935 | Nicholls | 73/250 |
| 3,344,667 | 10/1967 | Maltby | 73/239 |
| 3,657,925 | 4/1972 | Gross | 73/239 |
| 4,240,291 | 12/1980 | Anderson et al. | 73/861.05 |
| 4,398,428 | 8/1983 | Kato | 73/861.05 |
| 4,802,362 | 2/1989 | Hayes | 73/249 |

Primary Examiner—Herbert Goldstein

[57] ABSTRACT

The reciprocating piston positive displacement flow meter of the present invention comprises a hollow flow tube having a movable piston for reciprocal movement between opposite ends and a solenoid controlled valve assembly having a sliding valve member for reversing the direction of fluid flow through the flow tube in response to the activation and deactivation of a solenoid. The solenoid is switched from an activated state at one end of the piston stroke to an unactivated state at the opposite end.

5 Claims, 3 Drawing Sheets

RECIPROCATING PISTON POSITIVE DISPLACEMENT FLOW METER

FIELD OF INVENTION

This invention relates to a reciprocating piston positive displacement flow meter for measuring fluid flow on a continuous basis.

BACKGROUND OF THE INVENTION

The measurement of gas flow is becoming increasingly more important in the application and control of many processes as well as in the research laboratory. One of the accepted instruments for gas flow measurement and calibration is the bubble flow meter. In the basic form of the bubble flow meter a soap film is generated from a soap solution which is propelled by the gas flow under measurement from one end of the flow meter to the other. By timing the rise of the soap film between calibrated volume marks, the volume flow is obtained. Although it is generally agreed that the bubble flow meter accuracy may be affected by changes in ambient conditions such as humidity and temperature and is dependent upon gas flow rate it is understood that these factors can be readily corrected or compensated for in a laboratory setting. This is not however, as easily done in a field setting or in a commercial process environment. Moreover, the bubble flow meter is a cumbersome and generally unwieldy instrument to use as compared to a positive displacement piston type flow meter. A reciprocating piston flow meter also provides a continuous output reading independent of operator input and with a high degree of measuring accuracy. Heretofore such a device required multiple valves and an unwieldy valving arrangement.

SUMMARY OF THE INVENTION

The flow meter of the present invention utilizes a precision bore cylindrical flow tube with a movable piston which is automatically reciprocated from one end of the flow tube and back in a continuous fashion by means of a solenoid controlled valve assembly having a sliding valve member for reversing the direction of fluid flow through the flow tube in response to the operation of a solenoid.

The fluid flow positive piston displacement flow meter of the present invention comprises:

(a) a hollow flow tube having a movable piston disposed therein for reciprocal movement between a first and second piston position corresponding to the opposite ends of the piston stroke;

(b) a first flow path connected to said flow tube at one end thereof and a second flow path connected to said flow tube at the opposite end thereof;

(c) a solenoid-controlled valve assembly comprising a sliding valve member having opposite ends, a hollow interior extending between said opposite ends and an opening connected to said interior at each opposite end thereof; a valve body surrounding said sliding valve member, with said valve body having a first and second end, an inlet port located at said first end connected to said first flow path, and an outlet port located at said second end connected to said second flow path, and a solenoid for reciprocating said sliding valve member between said first and second ends of said valve body, so as to align said inlet port with one opening of said sliding valve member at one end thereof, when said sliding valve member is adjacent the second end of said valve body, and for aligning said outlet port with the opening in said sliding valve member at its opposite end, when said sliding valve member is adjacent said first end of said valve body;

(d) inlet and outlet means connected to said valve body for directing and withdrawing a fluid stream through said valve body, with said inlet member being connected through said sliding valve means to said outlet port and said outlet means being connected to said inlet port, when said sliding valve member is moved to said first end of said valve body, and with said inlet means being connected through said sliding valve means to said inlet port and said outlet member being connected to said outlet port when said sliding valve member is moved to said second end of said valve body;

(e) means for detecting the presence of said piston at each of said first and second positions, respectively; and (f) means for activating and deactivating said solenoid to reverse the movement of said sliding valve member in response to the detection of said piston at each such piston position, respectively.

BRIEF DESCRIPTION OF THE DRAWINGS

Other features and advantages of the present invention will become apparent from the following detailed description of the invention when read in conjunction with the accompanying drawings of which.

DETAILED DESCRIPTION OF THE INVENTION

Figure 1:
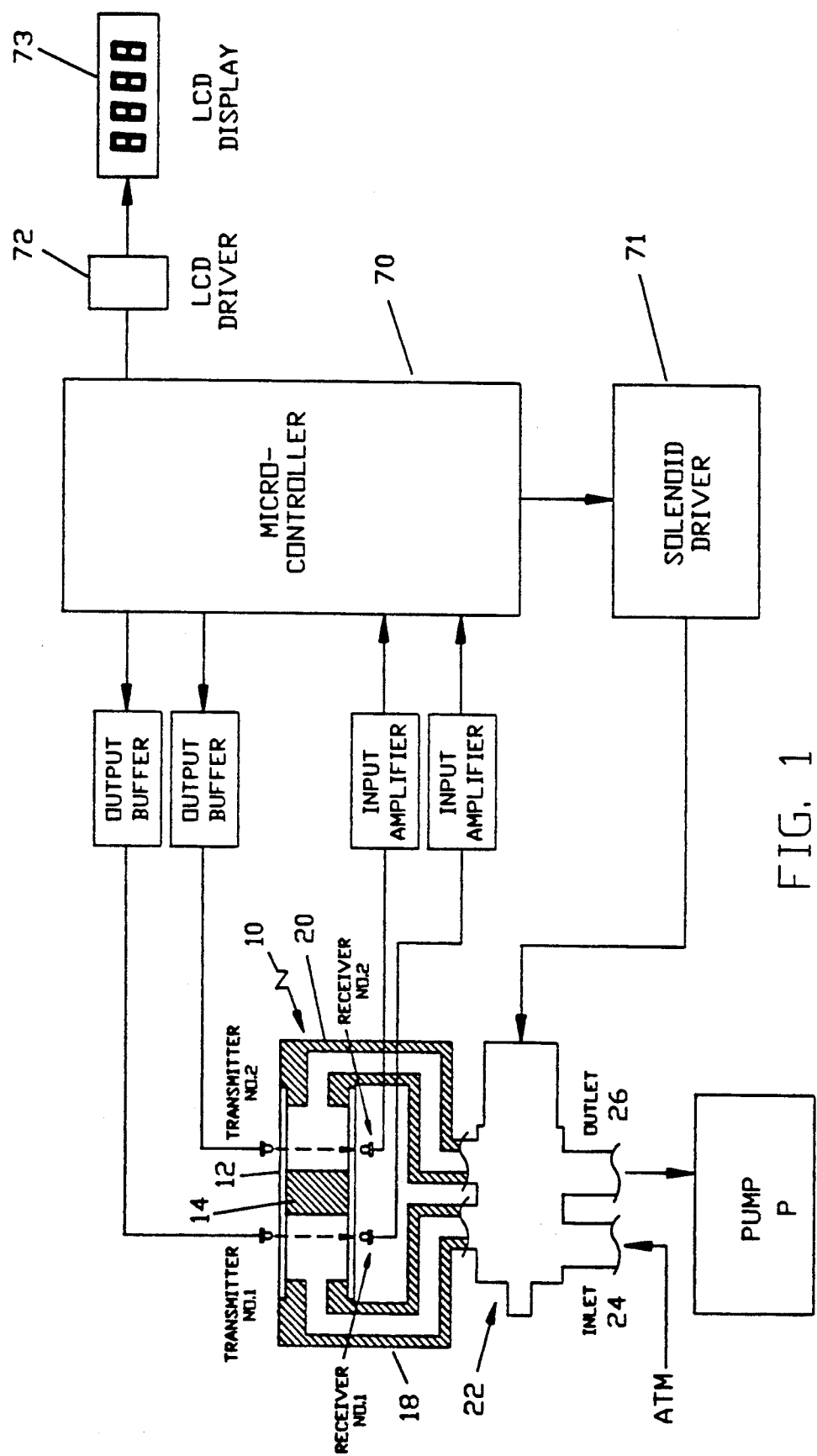
FIG. 1 is a partially schematic, partially diagrammatic view of the flow meter of the present invention and the overall system for measuring and displaying the measured fluid flow.

Referring now to FIG. 1 which illustrates the invention in terms of providing a continuous output reading corresponding to the rate of flow of a fluid being pumped by pump P from the atmosphere or from any desired compressible fluid source. The flow meter (10) comprises a hollow cylindrical precision bore open ended flow tube (12) with a movable solid piston (14) composed of a material such as graphite and disposed in the flow tube (12) with a tight tolerance to establish a substantially frictionless operation. The movement of the piston (14) is reversed continuously upon reaching a predetermined position at each opposite end of the flow tube (12) which is detected by a conventional set of photoelectric devices (1) and (2) respectively under the control of a programmed microcontroller (70). The microcontroller is a conventional special purpose microprocessor which upon receipt of a detected signal from a receiver activates or deactivates the solenoid control valve assembly (22) based on which receiver provides the signal. Each set of photoelectric devices may consist of an LED transmitter and receiver located at a given position along the flow tube (12) corresponding to each end thereof at which the piston (14) is to reverse direction.

The open ends of the flow tube (12) are connected to conduits (18) and (20) which are, in turn, connected to the solenoid control valve assembly (22). The solenoid control valve assembly (22) is connected to a pump P through an inlet and outlet fitting (24) and (26) respectively. As is more specifically shown in FIGS. 2 and 3 the solenoid controlled valve assembly (22), comprises a valve body (30) and a sliding valve member (32) in the form of a hollow tube of any desired composition. The tubular sliding valve member (32) has openings (33 and 34) at it's opposite ends for providing ingress and egress to and from the hollow interior of the tubular member (32). A guide pin (36) extends from one end of the sliding valve member (32) into sliding engagement within a female bore (35) formed in the valve body (30). The tubular sliding valve member (32) is attached at the opposite end to the movable armature section (38) of the solenoid (28) for movement in concert therewith. The solenoid (28) is a conventional device having an armature winding (40) wound about an armature consisting of the movable section (38) and a fixed section (42) separated by a compression spring (41) located between the two armature sections (38 and 42) respectively. The solenoid (28) has a mounting member (43) press fitted into the cavity (31) of the valve assembly (22) which is sealed by an o-ring (44).

The valve body (30) is coupled through port (45) to the conduit (18) for providing direct communication to the flow tube (12) through passageway (46) and is coupled through port (47) to the conduit (20) for providing direct communication to the flow tube (12) through passageway (48). Likewise the valve body (30) has ports (49) and (50) communicating with the inlet and outlet fittings (24) and (26) respectively.

A pair of sealing disks (52) and (54) are mounted over the sliding valve member (32) for engaging valve seats (55, 56, 57 and 58) depending upon the position of the sliding valve member (32). The valve seats (56) and (57) are formed on an annuler insert (60) mounted to the wall section (61) of the valve body (30). The valve seat (58) is formed as an extension of the mounting member (43) attached to the solenoid (28). The valve seat (55) extends from the wall section (63) of the valve body (30). The annuler insert (60) forms a cylindrical annulus (65) surrounding the tubular sliding valve member (32) which is sealed against leakage by o-rings (66) and (67) respectively.

Figure 2:
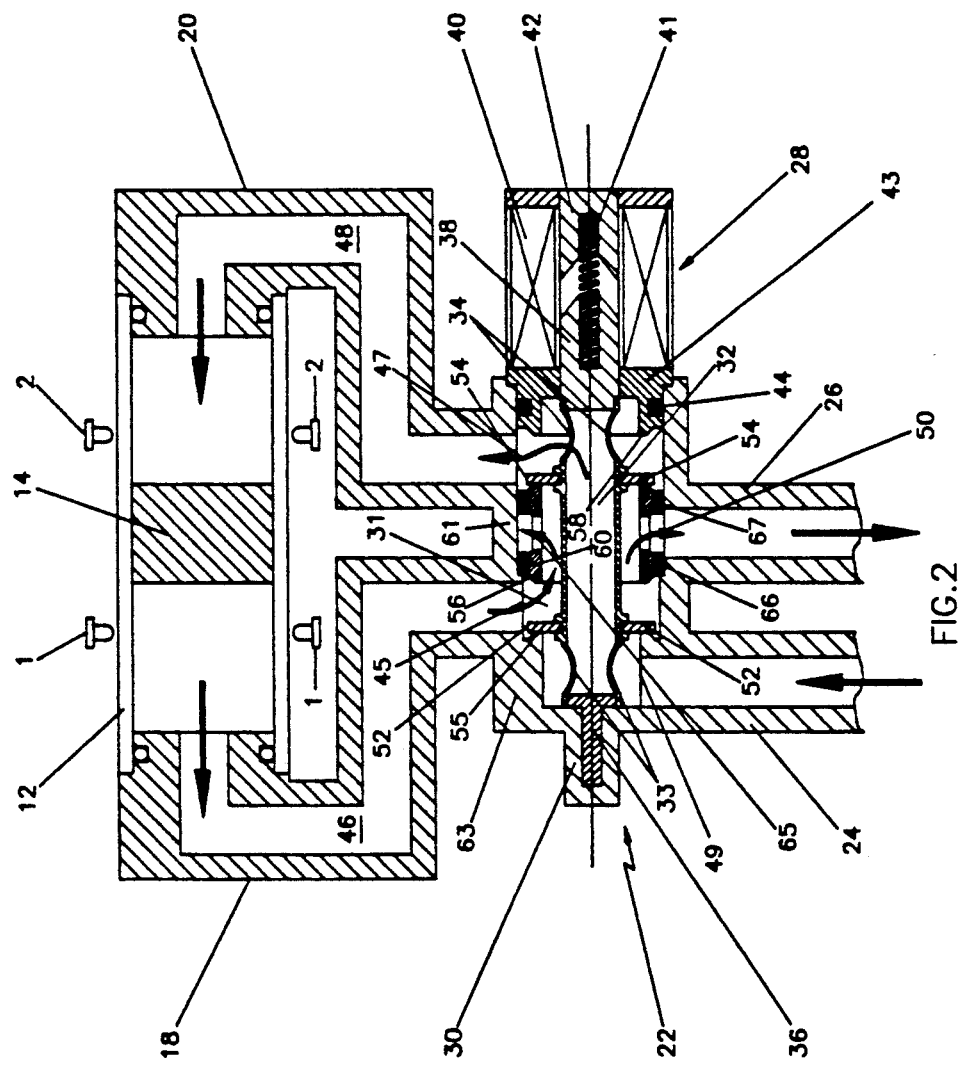
FIG. 2 is a view in vertical section of the solenoid controlled valve assembly of Figure with the solenoid shown in the unactivated state.
Figure 3:
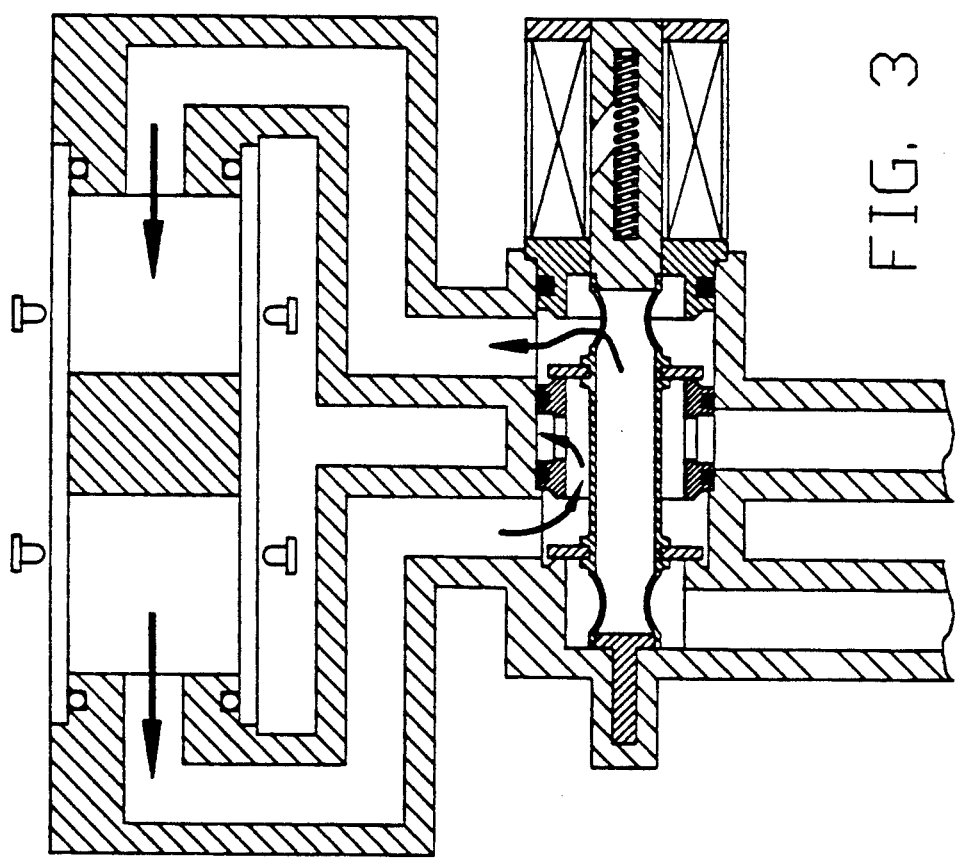
FIG. 3 is a view similar to FIG. 2 with the solenoid shown in the activated state.

The operation of the solenoid control valve assembly (22) is best understood by reference to the arrows in FIGS. 2 and 3 which identify the direction of fluid flow through the valve body (30) for controlling the direction of travel of the piston (14) in the flow tube (12). As shown in FIG. 2 air is fed from the atmosphere through the inlet fitting (24) into the cavity (31) of the valve body (30). The air then flows into the tubular sliding valve member (32) through the openings (33) and exits the tubular sliding valve member (32) through the openings (34) into the passageway (48) of conduit (20). The air stream proceeds into the open ended flow tube (12) as shown in FIG. 2 from the right hand side thereof causing the piston (14) to move from a position in line with the set of photoelectric devices (2) toward the set of photoelectric devices (1). The piston (14) forces an equal volume of air on the left hand side of the piston (14) to travel through passageway (46) in conduit (18) past port (45) into the cavity (31) from whence the air flows into the annulus (65) and then through the port (50) into the outlet fitting (26) back to the opposite side of the pump P. When the piston (14) reaches the set of photoelectric devices (1) detected signal is transmitted to the microcontroller (70). The micro-controller (70) delivers an output signal to a solenoid driver (71) representing a power amplifier for amplifying the signal from the microcontroller. The amplified signal is fed to the armature coil of the solenoid (28) for activating the solenoid (28) The micro-controller (70) is also programmed to time the interval between detected signals from the two sets of photoelectric devices (1) and (2) and to compute the flow rate from such information as is well known to those skilled. The micro-controller (70) also delivers a signal to the LCD driver (72) to provide a continuous output reading (73).

Upon activating the solenoid (28) the movable armature section (38) is moved into the cocked position against the fixed section (42) with the compression spring (41) fully compressed as shown in FIG. 3. In this position the air flow from the inlet fitting (24) passes into the cavity (31) and passes directly into the passageway (46) in conduit (18) through port (45) thereby reversing its direction into the flow tube (12). The piston (14) is now forced to move from the left hand side to the right hand side. An equal volume of air is pushed into passageway (48) of conduit (20) which flows through port (47) into cavity (31) and around the sliding valve member (32) into the outlet fitting (26) through port (50). The piston (14) will continue in this direction until its position is intercepted by the set of photoelectric devices (2) at which time the solenoid (28) is deactivated in response to a signal from the microcontroller 970) by means of the solenoid driver (71). Upon deactivation the solenoid (28) releases the armature section (33) which returns to its unactivated position as shown in FIG. 2 with the aid of the compression spring (41). The piston (14) now repeats itself traveling in the opposite direction toward the set of photoelectric devices (1) as earlier explained.

What is claimed is:

1. A flow meter for the continuous measurement of fluid flow comprising:
   (a) a hollow open ended flow tube having a movable piston disposed therein for reciprocal movement between a first and second piston position corresponding to the opposite ends of the piston stroke;
   (b) a first flow path connected to said flow tube at one open end thereof and a second flow path connected to said flow tube at the opposite end thereof;
   (c) a solenoid-controlled valve assembly comprising a sliding valve member having opposite ends, a hollow interior extending between said opposite ends and an opening connected to said interior at each opposite end thereof; a valve body surrounding said sliding valve member, with said valve body having a first and second end, an inlet port located at said first end connected to said first flow path, and an outer port located at said second end connected to said second flow path, and a solenoid for reciprocating said sliding valve member between said first and second ends of said valve body, so as to align said inlet port with one opening of said sliding valve member at one end thereof, when said sliding valve member is adjacent the first end of said valve body, and for aligning said outlet port with the opening in said sliding valve member at its opposite end, when said sliding valve member is adjacent said second end of said valve body;
   (d) inlet and outlet means connected to said valve body for directing and withdrawing a fluid stream through said valve body, with said inlet means being connected through said sliding valve means to said outlet port and said outlet means being connected to said inlet port when said sliding valve member is moved to said second end of said valve body, and with said inlet means being connected through said sliding valve means to said inlet port and said outlet means being connected to said outlet port when said sliding valve member is moved to said first end of said valve body;

(e) means for detecting the presence of said piston at each of said first and second positions, respectively; and (f) means for activating and deactivating said solenoid to reverse the movement of said sliding valve member in response to the detection of said piston at each such piston position, respectively.

2. A flow meter, as defined in claim 1, wherein said solenoid comprises an armature having a first and second section, an armature winding, and spring means disposed between said first and second section, with said second section of said armature being movable and engaging said sliding valve means so as to cause said sliding valve means to reciprocate in response to the energization and de-energization of said armature winding.

3. A flow meter, as defined in claim 2, wherein said flow tube is a precision bore cylindrical tube, and wherein said movable piston is composed of graphite and is fitted with a tight tolerance in said tube to establish substantially frictionless operation.

4. A flow meter, as defined in claim 3, wherein said fluid is air.

5. A flow meter, as defined in claim 4, wherein said means for activating and deactivating said solenoid comprises a microcontroller and solenoid driver.

* * * * *